(12) United States Patent
Eerola et al.

(10) Patent No.: US 11,585,822 B2
(45) Date of Patent: Feb. 21, 2023

(54) METHOD OF INFORMATION TRANSMISSION, A LIQUID HANDLING DEVICE, AND A SYSTEM

(71) Applicant: Sartorius Biohit Liquid Handling Oy, Helsinki (FI)

(72) Inventors: Iiro-Pekka Eerola, Helsinki (FI); Jouni Valtonen, Helsinki (FI)

(73) Assignee: Sartorius Biohit Liquid Handling Oy, Helsinki (FI)

( * ) Notice: Subject to any disclaimer, the term of this patent is extended or adjusted under 35 U.S.C. 154(b) by 344 days.

(21) Appl. No.: 16/911,499

(22) Filed: Jun. 25, 2020

(65) Prior Publication Data
US 2020/0408791 A1  Dec. 31, 2020

(30) Foreign Application Priority Data
Jun. 28, 2019  (EP) .................................. 19397523

(51) Int. Cl.
*B01L 3/02*  (2006.01)
*G01N 35/00*  (2006.01)
*G01N 1/14*  (2006.01)

(52) U.S. Cl.
CPC ......... *G01N 35/00732* (2013.01); *G01N 1/14* (2013.01); *G01N 2035/00752* (2013.01)

(58) Field of Classification Search
CPC ......... B01L 2300/021; B01L 2300/023; B01L 2300/025; B01L 3/021; G01N 1/14; G01N 2035/00752; G01N 35/00732
See application file for complete search history.

(56) References Cited

U.S. PATENT DOCUMENTS

| 6,080,364 A | * | 6/2000 | Mimura | G01N 35/026 422/65 |
| 7,488,283 B2 | * | 2/2009 | Yasui | H05K 13/0409 483/1 |
| 2008/0240984 A1 | * | 10/2008 | Wakamiya | G01N 35/00732 422/68.1 |
| 2013/0136672 A1 | * | 5/2013 | Blumentritt | B01L 3/0275 422/524 |
| 2013/0205920 A1 | * | 8/2013 | Tow | B29C 64/171 422/511 |
| 2013/0280143 A1 | * | 10/2013 | Zucchelli | B01L 3/0237 422/501 |

(Continued)

FOREIGN PATENT DOCUMENTS

DE     102013008016 A1    11/2014

*Primary Examiner* — Thien M Le
(74) *Attorney, Agent, or Firm* — Laine IP Oy

(57) ABSTRACT

According to an example aspect of the present invention, there is provided a method of information transmission in a system comprising at least one liquid handling device and at least one external device, the method comprising: in one or more of said at least one liquid handling device, producing a machine-readable code that contains information that is derived from a status or properties of the respective liquid handling device or information that has been stored in the respective liquid handling device; in said one or more of said at least one liquid handling device, displaying the respective code on a display that is integrated to a structure of the respective liquid handling device; reading the displayed code or one or more of the displayed codes by an external device.

19 Claims, 1 Drawing Sheet

(56) References Cited

U.S. PATENT DOCUMENTS

| | | | |
|---|---|---|---|
| 2014/0267695 A1* | 9/2014 | Scordato | G01F 22/00 |
| | | | 348/135 |
| 2015/0182961 A1 | 7/2015 | Arnold et al. | |
| 2017/0120235 A1 | 5/2017 | Miettinen et al. | |
| 2017/0274372 A1* | 9/2017 | Katano | G01N 35/1002 |
| 2020/0408791 A1* | 12/2020 | Eerola | G01N 1/14 |

* cited by examiner

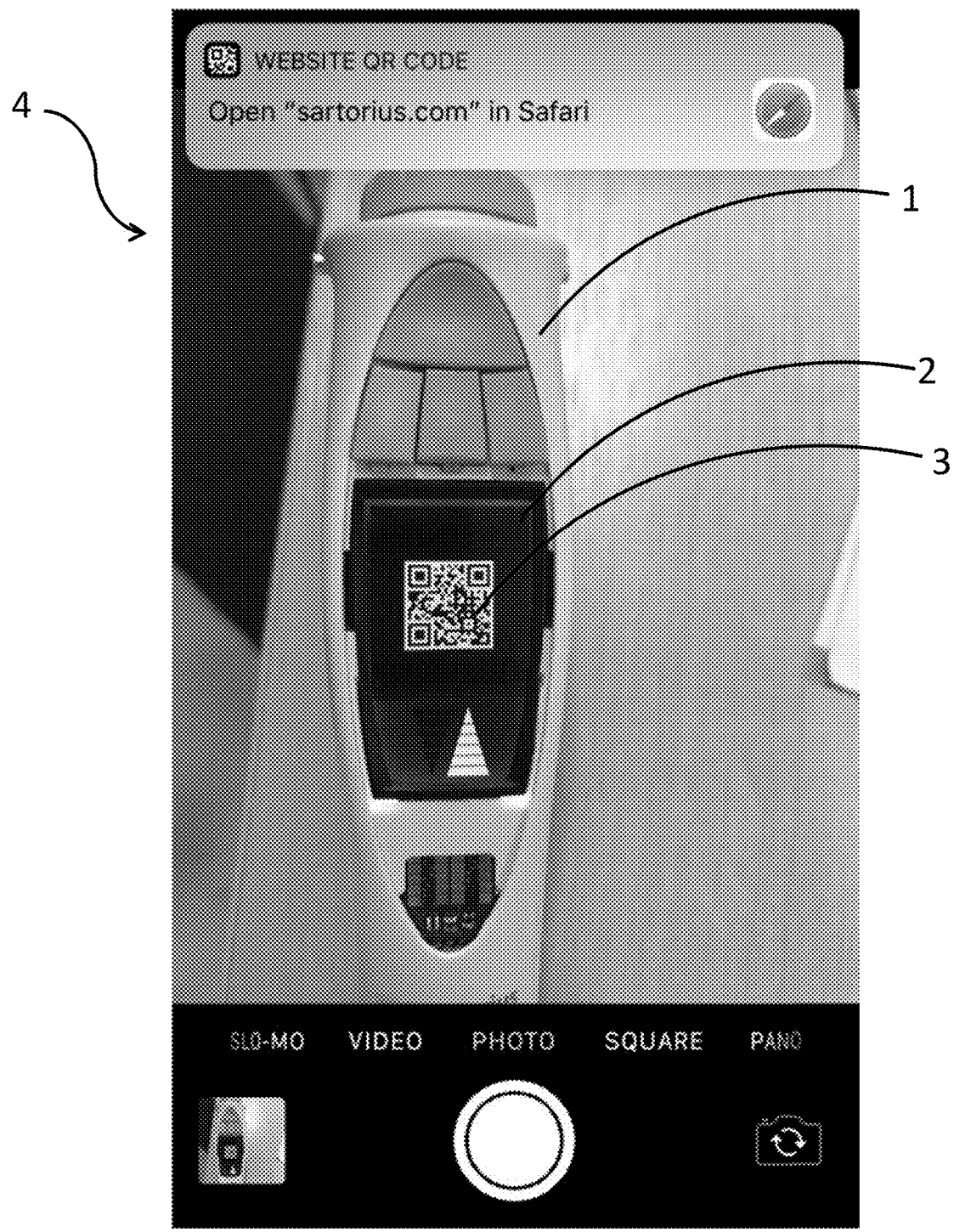

METHOD OF INFORMATION TRANSMISSION, A LIQUID HANDLING DEVICE, AND A SYSTEM

FIELD

The present invention relates to information transmission from a liquid handling device, more particularly to information transmission by means of a machine readable code.

BACKGROUND

Communication between an electronic handheld pipette and a user traditionally takes place via the buttons and the display of the pipette. The user inputs commands and performs programming actions, such as selection of parameters for aspiration and dispensing events, by pressing pipette buttons. As a response, the pipette displays information on the pipette display in the form of alphanumeric characters and graphic symbols. The user reads and interprets the characters and symbols visually.

The size, resolution and orientation of the pipette display, the pipette software, and the pipette memory size set limits to the type and amount of information that can be displayed and observed or read by the user. Thus, there is a need to improve information transmission between a pipette and its user.

It is known to use wireless techniques, such as RFID and NFC technology, for data transfer in a laboratory environment. The NFC technique is applicable within a distance of a few centimetres. Implementation of such technology to a laboratory device requires incorporation of additional components into the structure of the device, which increases costs. A further disadvantage of NFC-based solutions is that the laboratory device to be detected and communicated with must be selected by means of using a dedicated frequency.

There is a need for an improved method of communication between a liquid handling device and an external system or between a liquid handling device and its user in the course of pipetting and particularly in environments and contexts of manual pipetting or maintenance or servicing actions.

There is a need for a method of communication between a pipette and a user which can be implemented without any changes to the pipette hardware.

SUMMARY OF THE INVENTION

The invention is defined by the features of the independent claims. Some specific embodiments are defined in the dependent claims.

According to a first aspect of the present invention, there is provided a method of information transmission in a system comprising at least one liquid handling device and at least one external device, the method comprising: in one or more of said at least one liquid handling device, producing a machine-readable code that contains information that is derived from a status or properties of the respective liquid handling device or information that has been stored in the respective liquid handling device; in said one or more of said at least one liquid handling device, displaying the respective code on a display that is integrated to a structure of the respective liquid handling device; reading the displayed code or one or more of the displayed codes by an external device.

Various embodiments of the first aspect may comprise at least one feature from the following bulleted list:

The code is a matrix barcode.

The liquid handling device is an electronic handheld pipette.

The liquid handling device is an automated liquid handling system.

At least two machine-readable codes are produced and displayed, of which codes at least one contains real-time status data.

The external device is a handheld external smart device.

The reading of the code is carried out by a camera of the handheld external smart device.

The external device comprises a machine vision system, preferably configured to read all the displayed codes simultaneously.

After reading the code, the information is displayed on a display integrated to a structure of the external device.

After reading the code, the information is conveyed to a user of the external device.

The method is carried out during servicing or manufacturing of said at least one liquid handling device.

The information comprises one or more of the following: use history of the pipette, pipette use instructions, calibration status, calibration instructions, servicing status, servicing instructions, manufacturing status, errors occurred during calibration or servicing or manufacturing, information about type or availability of compatible tips or spare parts, technical specifications of the pipette, location of the pipette, use restrictions of the pipette.

The information comprises context-specific use instructions that are based on use history or current operational status of the pipette.

Said producing and displaying steps are triggered by a user, preferably by inputting a command by means of a button or a touch screen of the liquid handling device.

Said producing and displaying steps are triggered by a command transmitted from an external control system to the liquid handling device via a wired or wireless communication method.

Said producing and displaying steps are triggered by the liquid handling device itself automatically upon reaching a predetermined status.

According to a second aspect of the present invention, there is provided a liquid handling device comprising: means for producing a machine-readable code that contains information that is derived from a status or properties of the liquid handling device or information that has been stored in the liquid handling device; means for displaying the code on a display that is integrated to a structure of the liquid handling device; means for triggering said producing and displaying steps either automatically or after receiving a triggering command received from a user or from an external control system.

Various embodiments of the second aspect may comprise at least one feature from the following bulleted list:

The liquid handling device is an electronic handheld pipette.

The external device is a handheld external smart device.

According to a third aspect of the present invention, there is provided a system, comprising an external device and at least one liquid handling device according to the second aspect, wherein: the external device is arranged for retrieving information from each of said at least one liquid handling device, the external device comprises a code reader configured to read the codes displayed on the displays of said at least one liquid handling devices.

Various embodiments of the third aspect may comprise at least one feature from the following bulleted list:

Said at least one liquid handling device comprises at least two hand-held electronic pipettes.

The code reader is a machine vision system.

The present invention provides a number of advantages.

At least some embodiments of the present invention provide a versatile and quick method of displaying and communicating information to a user of the pipette in a context-specific way at user-selected points of time and place in the course of pipette use.

At least some embodiments of the present invention provide a facile method for retrieving status information from multiple pipettes for manual maintenance actions, quality checks or information retrieval.

By means of the present invention, ad hoc information retrieval from a liquid handling device or multiple liquid handling devices, independent of their physical structure or hardware, is possible.

The present invention can be implemented in electronic liquid handling devices without any changes to their physical structure or hardware.

BRIEF DESCRIPTION OF THE DRAWINGS

FIG. 1 illustrates implementation of the present invention in accordance with the embodiment of Example 1.

EMBODIMENTS

Definitions

In the present context, the term "smart device" refers to an electronic device that can be connected to other devices or networks via different wireless protocols. Examples of smart devices include smart phones, tablets and laptops.

In the present context, the term "pipetting event" comprises a combination of one or more aspiration events and/or one or more dispensing events.

In the present context, the term "pipetting cycle" comprises a combination of at least two pipetting events.

In some embodiments, the present invention provides a method of conveying context-specific information or instructions to a user of a liquid handling device via its display. The information is provided in the form of a machine-readable code. The displaying of the code can be triggered by the user.

According to an embodiment, a machine-readable code is displayed on a display of a liquid handling device, such as a handheld pipette, as a response to an external request or act. The request can comprise pressing of a pipette button, touching a display screen of the pipette, or connecting the pipette to a charging dock.

The request may comprise a command received by the liquid handling device from an external control system, such as a laboratory management system.

The request or the triggering event may be the completion of a certain pipetting event or cycle: Upon completion of the event or cycle, the pipette may automatically display a code that contains context-specific information or a summary of previous pipetting events and a current status. Also in the case that a certain operational or functional status has been reached by the pipette, the generation and display of a code may be triggered automatically, the code containing for example a status report.

The triggering event may be an error or failure occurred during operation of the liquid handling device. The code may in this case contain detailed error information and optionally also instructions for rectifying the error.

The liquid handling device can be an automated liquid handling system or a handheld liquid handling device, such as a handheld electronic pipette.

In one embodiment, the liquid handling device is an automated liquid handling system, and a display of the liquid handling system regularly or continuously shows a machine-readable code that contains error or status information derived from the operation of the liquid handling system. Preferably, the code is displayed continuously and it contains real-time error and status information so that a user may at any time read the code and obtain the information.

Preferably, the machine-readable code is a linear barcode or a matrix barcode, such as a QR code. In some embodiments, a number of codes are generated and displayed on a display of a liquid handling device, whereby the codes may comprise the same of different information. For example, the same information may be displayed simultaneously by means of a linear barcode and by means of a matrix barcode to enable the reading of the code with various code reader techniques.

Preferably, the code reader is any code reader suitable for reading the generated machine readable code, for example a camera, a barcode reader or a machine vision system. Preferably, the code reader is integrated to the structure of the external device.

Preferably, the display of the liquid handling device has a resolution that is sufficient for displaying a machine readable code, such as a matrix barcode, for example a QR code.

In one embodiment, the code is a three-dimensional code, such as a matrix barcode in which the third dimension is colour. Advantageously, the display of the pipette is a colour display, such as an RGB display. The advantage of this embodiment is that more information can be included in the code.

In preferred embodiments, after reading the code, the information is conveyed to a user of the external device, for example the external device may display the information contained in the code, or part of said information, on its own display.

In one embodiment, the pipette produces a machine-readable code that contains information that is derived from a status of the pipette. The status may be an operational status or a structural status of the pipette.

In one embodiment, the information comprises one or more of the following group: use history of the pipette, use instructions, calibration status, calibration instructions, information about compatible tips or spare parts, technical specifications of the pipette.

The information may comprise a link to a web site providing a collection of use instructions or tutorial videos for the liquid handling device in question.

In some embodiments, the matrix barcode comprises information about a structural status of the pipette, such as the physical structure of the pipette itself, the tip that is currently attached to the tip cone, compatible tips, compatible spare parts, or implications derived therefrom. Examples of such information: pipette model, tip volume, tip type, spare part type, price, technical specifications, availability of spare parts and tips, recommendations about other pipette models with similar or improved properties, recommendations about laboratory ware or software that is compatible with the pipette or its software.

In some embodiments, the matrix barcode comprises information about an operational status of the pipette, such as usage of the pipette or implications derived therefrom. Examples of such information: last calibration, recommended next calibration, pipetting history, charging status and history, last-used-by information.

In some embodiments, the liquid handling device may automatically generate usage pattern information from tracked usage history, such as user history and executed pipetting cycle history, and incorporate the usage pattern information into the code. Such usage patterns may reflect or describe behavioural patterns of the users.

In some embodiments, the matrix barcode comprises information about the previous or forthcoming (programmed) pipetting cycles or events or implications derived therefrom. Examples of such information: information about the latest pipetting event, information about the next pipetting action in the currently executed pipetting cycle, recommendations for improving aspiration or dispensing accuracy, links to a user manual, use instructions that are relevant for a current or previous operational status of the pipette, instructions for solving problems or errors detected in the course of previous pipetting events.

Pipette usage data may comprise information about pipetting events, such as dispensed volume, tip type that was used, number of doses dispensed, ambient conditions as observed by the pipette, errors detected.

In one embodiment, the pipette generates and displays a matrix barcode that contains a link to a web shop in which the user can order tips or other spare parts that are compatible with the pipette. In one embodiment, the pipette generates and displays a matrix barcode that contains a link to a web shop in which the user can order tips that are similar to the one attached to the pipette.

In one embodiment, upon request of a user, the pipette generates and displays a matrix barcode that contains calibration and/or servicing instructions: for example when to perform the next calibration or servicing and where to send the pipette for calibration or servicing. In one embodiment, the pipette generates and displays a matrix barcode that contains a link to a web page of a calibration service provider where the user can submit a calibration service order.

In one embodiment, when the due date for the next calibration of servicing is reached or a failure has been observed in the functioning of the pipette, the pipette automatically displays a code containing calibration or servicing information or instructions. The information can be accessed by reading the code by means of a smartphone. For example, the information may comprise a link to a service provider's web site or detailed instructions about which parts of the pipette require servicing or replacement or have caused error messages.

In one embodiment, if an error has been detected during a pipetting cycle, the pipette displays a code containing a detailed error report. The report can be accessed by reading the code by means of a smartphone, which then displays the report on its own display.

In one embodiment, the pipette can be paired with an external smart device by simply reading a matrix barcode from the pipette display by means of the external smart device in order to establish a Bluetooth connection. Generation of the code containing pairing data can be triggered by the user of the pipette for example via the user interface or menus of the pipette. The advantage of this embodiment is that the pairing method is simple to carry out, and inputting of security codes or like is not needed.

The machine readable code on the pipette display can be read by a camera of a hand-held or portable external smart device, for example a camera of a mobile phone, a tablet or a laptop.

In other embodiments, the machine readable code or codes on the pipette display or displays can be read by an external device that is connected to an external control system by a wired or wireless connection. After the code has been read, the information contained in the code is conveyed to the external control system and for example displayed to a user of the external control system or stored. The user of the external device and the user of the external control system may be the same or different.

In one embodiment, a machine vision system can be utilized for reading an individual code or multiple codes simultaneously or sequentially. In some embodiments, reading of the code or codes displayed by a liquid handling device or multiple codes displayed by a number of liquid handling devices is carried out by a machine vision system that is part of or connected to an external control system that monitors the liquid handling device or devices. The external control system obtains the information contained in the code or the codes by inspecting the displays of the liquid handling devices via the machine vision system.

EXAMPLES

Example 1

In this example, a handheld electronic pipette 1 displays a QR code 3 on its display 2 when the pipette is connected to a charging dock. The QR code comprises a link to a web page of the pipette manufacturer (such as www.sartorius.com). A camera of a mobile phone is used for reading the QR code. After the code is read, the browser of the mobile phone opens and shows the web page. FIG. 1 illustrates implementation of this example. FIG. 1 shows a screenshot 4 taken upon reading the code by means of the mobile phone camera application.

Example 2

In this example, during servicing and maintenance of a pipette, a technician triggers the displaying of a QR code on a pipette display after execution of a diagnostics software or tool in the pipette. The QR code comprises the diagnostics results. The code is read by a camera of a handheld or portable smart device that is used by the technician, and the results are shown on the display of the smart device to the technician.

Example 3

During pipette manufacturing, the present invention can be used in the context of multiple pipettes and an external control system communicating with them and monitoring them. The control system may send a command to each pipette in a particular manufacturing stage in order to trigger the displaying of a two-dimensional code on the display of each pipette. The code may comprise information that is derived from the status of the respective pipette. For example, the code may comprise information about eventual errors or abnormalities occurred during the previous manufacturing and assembly steps.

The codes displayed on the displays of the pipettes can be read simultaneously or sequentially by means of a machine vision system. Any combination of the codes may be read. Such a system may be positioned in front of a set of pipettes so that the reading of all the desired codes simultaneously is possible. The machine vision system sends the information contained in the codes to the external control system for further evaluation and processing.

Example 4

During pipette manufacturing or servicing, instead of an automated and centralized machine vision system, a user or a technician may carry out the reading of the codes by using a manually operated machine vision system or any hand-held code reader suitable for the task. The technician may use a smart phone or any other hand-held smart device and its camera, such as a HD camera, for reading individual codes or multiple codes. In this way the technician can manually check the status of multiple pipettes quickly for example for quality control purposes or to detect eventual errors occurred during automated manufacturing or calibration steps.

Example 5

The pipette may automatically display a code after each completed stage during manufacturing, assembly and programming. In this way, information about the status of the pipette and any abnormalities therein is regularly available via the code shown on the display of the pipette.

Example 6

In one embodiment, the code may comprise location data generated by means of a GPS chip. A GPS chip contained in an external device may be used for generating the location data for a liquid handling device. On the basis of the observed location data of the pipette, certain functions or applications of the smartphone may be activated or deactivated. For example, pipette control software in the smartphone may be deactivated if the pipette is located outside a predetermined zone in order to prevent pipetting.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

INDUSTRIAL APPLICABILITY

Some embodiments of the present invention are industrially applicable at least in electronic liquid handling devices.

ACRONYMS LIST

QR code Quick Response Code
NFC Near Field Communication

The invention claimed is:

1. A method of information transmission in a system comprising at least one liquid handling device and at least one external device, the method comprising:
in one or more of said at least one liquid handling device, producing a machine-readable code that contains information that is derived from a status or properties of the respective liquid handling device or information that has been stored in the respective liquid handling device;
in said one or more of said at least one liquid handling device, displaying the respective machine-readable code on a display that is integrated to a structure of the respective liquid handling device; and
reading the displayed machine-readable code via an external device,
wherein the respective machine-readable code is displayed on the display upon connection of the respective liquid handling device to a charging dock.

2. The method according to claim 1, wherein:
the machine-readable code is a matrix barcode; and
the at least one liquid handling device is an electronic handheld pipette.

3. The method according to claim 1, wherein the at least one liquid handling device is an automated liquid handling system, and wherein at least two machine-readable codes are produced and displayed, of which machine-readable codes at least one contains real-time status data.

4. The method according to claim 1, wherein:
the external device is a handheld external smart device; and
the reading of the machine-readable code is carried out by a camera of the handheld external smart device.

5. The method according to claim 1, wherein the external device comprises a machine vision system configured to read all the displayed machine-readable codes simultaneously.

6. The method according to claim 1, further comprising:
after reading the machine-readable code, the information is displayed on a display integrated to a structure of the external device.

7. The method according to claim 1, further comprising:
after reading the machine-readable code, conveying the information to a user of the external device.

8. The method according to claim 1, wherein the method is carried out during servicing or manufacturing of said at least one liquid handling device.

9. The method according to claim 1, wherein the information comprises one or more of the following: use history of the pipette, pipette use instructions, calibration status, calibration instructions, servicing status, servicing instructions, manufacturing status, errors occurred during calibration or servicing or manufacturing, information about type or availability of compatible tips or spare parts, technical specifications of the pipette, location of the pipette, or use restrictions of the pipette.

10. The method according to claim 1, wherein the information comprises context-specific use instructions that are based on use history or current operational status of the pipette.

11. The method according to claim 1, wherein said producing and displaying steps are triggered by a user by inputting a command via a button or a touch screen of the liquid handling device.

12. The method according to claim 1, wherein said producing and displaying steps are triggered by a command transmitted from an external control system to the liquid handling device via a wired or wireless communication method.

13. The method according to claim 1, wherein said producing and displaying steps are triggered by the liquid handling device itself automatically upon reaching a predetermined status.

14. A liquid handling device comprising:
means for producing a machine-readable code that contains information that is derived from a status or properties of the liquid handling device or information that has been stored in the liquid handling device;
means for displaying the code on a display that is integrated to a structure of the liquid handling device; and
means for triggering said producing and displaying steps either automatically or after receiving a triggering command received from a user or from an external control system, wherein the information comprises location data of the liquid handling device generated by a Global Positioning System (GPS) chip.

15. The liquid handling device according to claim 14, wherein the liquid handling device is an electronic handheld pipette, and the external device is a handheld external smart device.

16. A system comprising an external device and at least one liquid handling device according to claim 14, wherein:
the external device is arranged for retrieving information from each of said at least one liquid handling device, and
the external device comprises a code reader configured to read the codes displayed on the displays of said at least one liquid handling devices.

17. The system according to claim 16, wherein said at least one liquid handling device comprises at least two hand-held electronic pipettes.

18. The system according to claim 16, wherein the code reader is a machine vision system.

19. A method of information transmission in a system comprising at least one liquid handling device and at least one external device, the method comprising:
in one or more of said at least one liquid handling device, producing a machine-readable code that contains information that is derived from a status or properties of the respective liquid handling device or information that has been stored in the respective liquid handling device;
in said one or more of said at least one liquid handling device, displaying the respective machine-readable code on a display that is integrated to a structure of the respective liquid handling device; and
reading the displayed machine-readable code via an external device, wherein said producing and displaying steps are triggered by the at least one liquid handling device itself automatically upon the occurrence of an error in the operation of the at least one liquid handling device, and wherein the machine-readable code comprises instructions for rectifying the error.

* * * * *